United States Patent
Pitkänen

Patent Number: 6,012,724
Date of Patent: Jan. 11, 2000

[54] WHEEL SUSPENSION SYSTEM

[76] Inventor: Toivo Johannes Pitkänen, JL 74 Peritalo, FIN-88400 Ristijärvi, Finland

[21] Appl. No.: 08/722,167

[22] PCT Filed: Apr. 10, 1995

[86] PCT No.: PCT/FI95/00195

§ 371 Date: Oct. 2, 1996

§ 102(e) Date: Oct. 2, 1996

[87] PCT Pub. No.: WO95/27629

PCT Pub. Date: Oct. 19, 1995

[30] Foreign Application Priority Data

Apr. 9, 1994 [FI] Finland .................... 940199 U
Dec. 16, 1994 [FI] Finland .................... 945923

[51] Int. Cl.[7] ............................................ B62D 17/00
[52] U.S. Cl. .......................... 280/6.155; 280/124.112; 180/41; 180/9.54
[58] Field of Search .................. 180/9.21, 9.54, 180/9.52, 308, 358, 9.28, 41; 280/6.155, 124.112, 124.111, 124.113, 124.134

[56] References Cited

U.S. PATENT DOCUMENTS

| | | | |
|---|---|---|---|
| 1,483,154 | 2/1924 | Bovee | 280/124.134 |
| 2,694,581 | 11/1954 | Helmle | 180/9.54 |
| 3,751,061 | 8/1973 | Scheuerpflug | 280/96.2 R |
| 3,779,581 | 12/1973 | Scheuerpflug | 280/124.134 |
| 3,930,553 | 1/1976 | Kopera et al. | 180/9.28 |
| 4,620,602 | 11/1986 | Capriotti | 180/9.21 |
| 4,971,348 | 11/1990 | Oyama et al. | 280/661 |
| 5,082,306 | 1/1992 | Khavkin | 280/661 |

FOREIGN PATENT DOCUMENTS

| | | |
|---|---|---|
| 2056257 | 4/1971 | France . |
| 9000132 | 1/1990 | WIPO . |

*Primary Examiner*—Kevin Hurley
*Attorney, Agent, or Firm*—Steinberg & Raskin, P.C.

[57] ABSTRACT

Wheel suspension system for a vehicle having a frame and a wheel oriented in a longitudinal direction of the vehicle. The system includes an axle beam coupled to the frame of the vehicle and a traction motor coupled to the wheel for rotating the wheel. The traction motor is pivotally coupled to the axle beam such that the wheel is tiltable in a direction transverse to the longitudinal direction of the vehicle. To this end, an intermediate support is connected to the axle beam by a first suspension pin and to the traction motor by a second suspension pin whereby the first suspension pin is substantially parallel to the second suspension pin.

17 Claims, 7 Drawing Sheets

WHEEL SUSPENSION SYSTEM

FIELD OF THE INVENTION

The present invention relates to a wheel suspension system for a vehicle or equivalent, said wheel suspension system comprising a wheel hub mounted on an axle beam, respectively, on a traction motor, on which the wheel has been mounted.

BACKGROUND OF THE INVENTION

In prior art structures, the wheel has been pivotably connected to a part in the axial system so that the geometrical structure thereof has also defined the lateral tilting of the wheel. In addition, the overall tilting of the vehicle has affected also the tilting of the wheel.

OBJECTS AND SUMMARY OF THE INVENTION

The object of the present invention is to disclose a novel wheel suspension system with which the drawbacks of the prior art structures are avoided in driving in varying terrain circumstances. In order to achieve the aims set for the invention, the invention is mainly characterized in that the wheel hub, and respectively the traction motor, has been mounted on the axle beam articulatedly, mainly by means of a longitudinal suspension pin of the vehicle or equivalent, said suspension pin being positioned substantially in the vertical centerline of the wheel, in height direction at a space below the horizontal central axis of the wheel so that the wheel is enabled to tilt freely, adapting itself to the running ground, around the suspension pin irrespective of the tilting of the vehicle or equivalent, and/or of the axle beam.

The most significant advantage of the design of the invention is that the lateral tilting of the wheel can be adapted according to the driving ground, and to distribute the surface pressure uniformly. The friction can at the same time be optimally utilized. In order to function optimally, without continuous forced driving, a relatively wide tire needs to be included in the structure.

BRIEF DESCRIPTION OF THE DRAWINGS

The invention is described below more in detail, reference being made to the accompanying drawings with which certain structural alternatives of the invention are demonstrated.

DETAILED DESCRIPTION OF THE INVENTION

Accordingly, FIGS. 1 to 4 of the drawing present the wheel suspension system of the invention applied in an axial system provided with separate springs. In the structure shown in the figures the axial system is comprised of "axle halves", that is, supporting arms 5, swingingly pivotedly attached to a connection piece 8 mounted with a center pin 6 on the vehicle frame (not shown). In embodiment shown in FIGS. 1 to 4, both supporting arms 5 have been articulated on a common central pin 6, though it is clear that the supporting arms 5 can be suspended on the connection piece 8 also separately, with articulation pins of their own. The supporting arms 5 are provided with spring elements 7 for which hydraulic cylinders 7 have been used in the presentation of the figures, said cylinders being most preferably connected with a hydraulic pipe system to an external hydraulic accumulator (not shown). In the presentation of the figures the structure of the axle system has been connected to the frame structures of the vehicle with a vertical pin 9, around which pin the entire axial system can be pivoted for steering. In a steerable axle system like this the steering mechanism can be coupled e.g. onto said vertical pin 9 or connection piece 8. It is obvious that the wheel suspension system of the invention may also be used in association with a non-steered axle system, though not depicted in the figures of the drawing.

In the design of the invention the wheels 1 of the vehicle or equivalent have been suspended to the axle system as follows. The figures present a tracting axial system for which the design of the invention is most appropriate and in which the greatest advantages can be gained therewith. In the axle system, i.e. in the supporting arm 5 shown in the embodiment of the figures a traction motor 2 has been installed for each wheel 1, preferably a hydraulic motor (hydrostatic motor), being articulately attached to the supporting arm 5 of the axle system by of a suspension pin 3. Thus, the traction motor 2 is allowed to turn freely relative to the supporting arm 5 around the pin 3. The axle of the traction motor 2 is provided with a flange 2a, whereon the wheel 1 has been fixed. Consequently, the axle of the traction motor 2 is joined with the of wheel 1 at its horizontal central axis depicted with reference A in FIG. 1. As is demonstrated in FIG. 1, the pin 3 by means of which the traction motor 2 has been attached to the supporting arm 5 is located substantially in the vertical centerline of wheel 1 and substantially below the central axis A of the wheel in height direction, whereby said height-direction distance between the pin 3 and the central axis A of wheel 1 is indicated by reference 1. As can be also seen in the figures, the direction of the pin 3 is mainly the running direction of the axial system.

Figure 1:
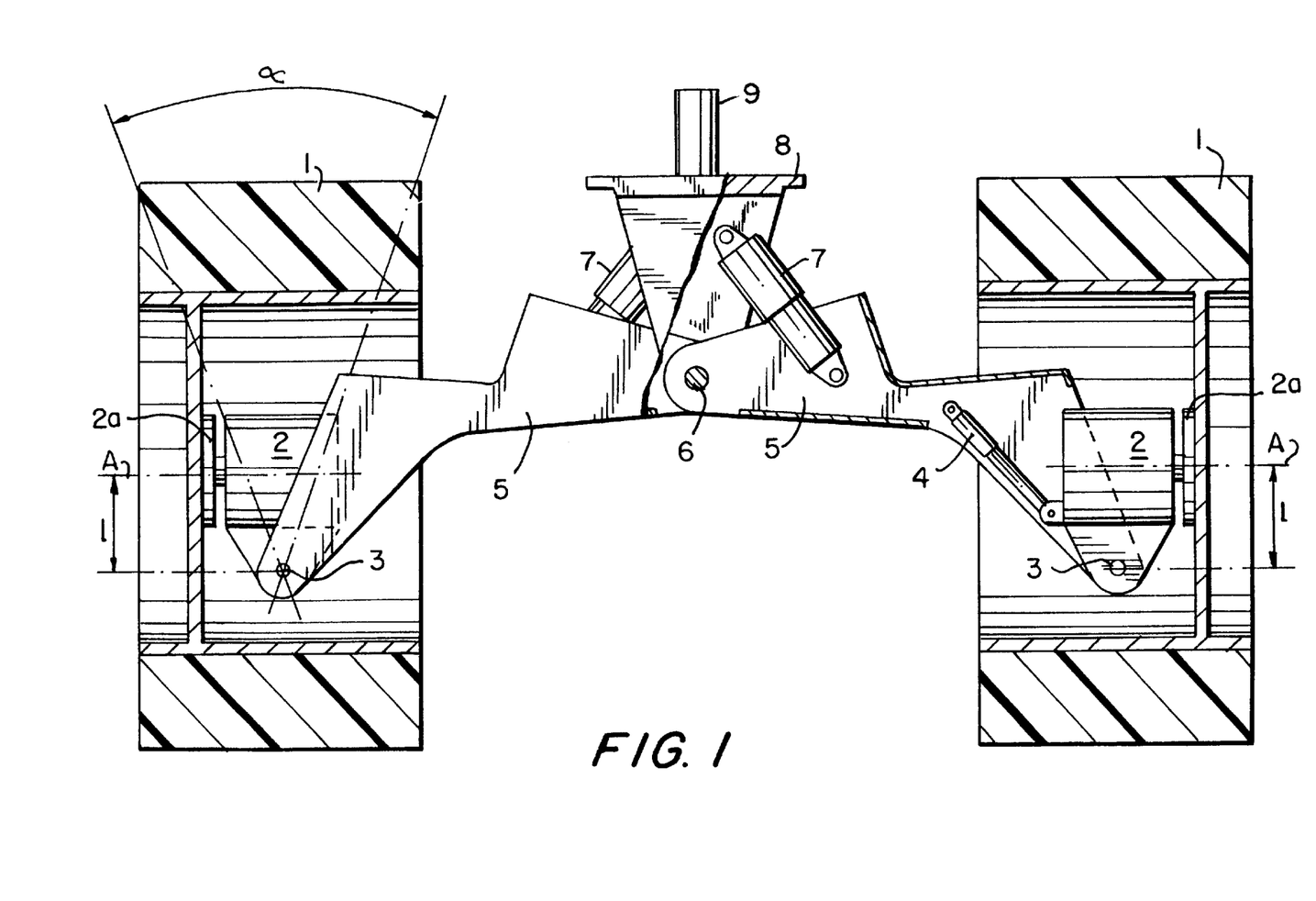
FIG. 1 presents in front view and partly sectioned an advantageous embodiment of the wheel suspension system of the invention, applied in an axial system provided with separate springs.
Figure 2:
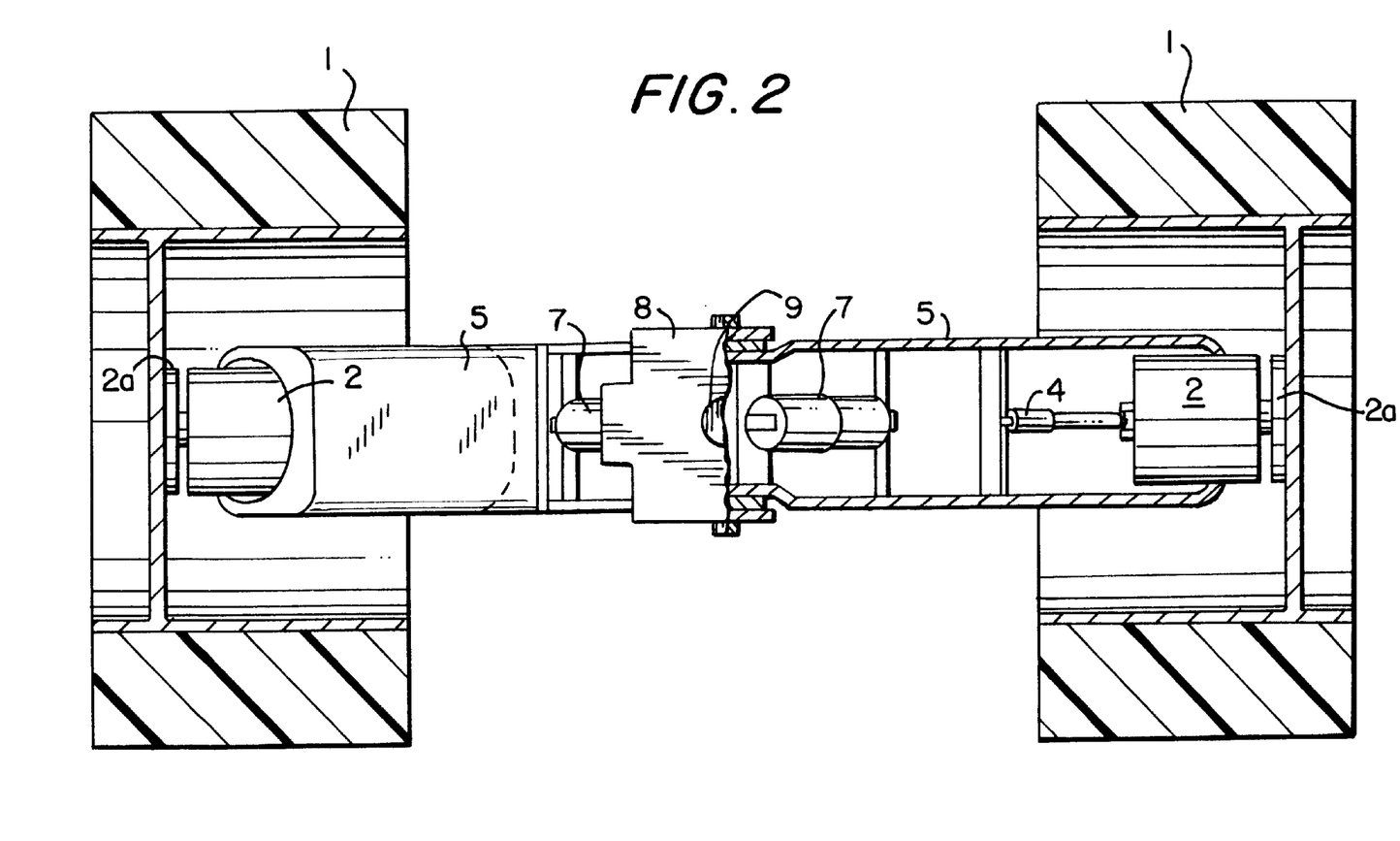
FIG. 2 presents partly sectioned the design of FIG. 1, in top view of FIG. 1.

Each wheel 1 is thus enabled to tilt around the pin 3 so that the wheel 1 is enabled to accomodate itself according to unevennesses of the terrain or equivalent running base.

It is moreover shown in FIGS. 1–4 that the suspension arrangement is provided with a damping means 4 with which the tilting of the wheel 1 can be damped if considered necessary. In the presentation of the figures a hydraulic cylinder 4 can be used as a damping means with which cylinder the tilting of the wheel 1 can be effectively controlled and with which the wheel 1 can, if needed, be locked in place so that its tilting around the pin 3 has been prevented. The wheel suspension system has moreover been provided with tilt limiters (not shown) wherewith the tilting angle α of the wheels 1 has been confined to a desired value so that the wheel 1 is not permitted, not even in adverse terrain circumstances, to "fall under".

The structure is examined below more in detail as well as the effect of the dimensions of the structure on the properties. The tire profile, selected according to the need (ratio of the outer tire diameter and the center hole or the ratio of the tire width and the outer tire diameter), affects the height position of the pin 3 from the running ground on the vertical centerline of the tire. The stability of the wheel is enhanced the lower the suspension pin 3 is placed, that is, the greater is the ratio of the distance 1 between the pin 3 and the horizontal central axis A of the wheel 1 with the distance of the central axis A of the wheel from the running ground, that is with the radius of the wheel.

Figure 3:
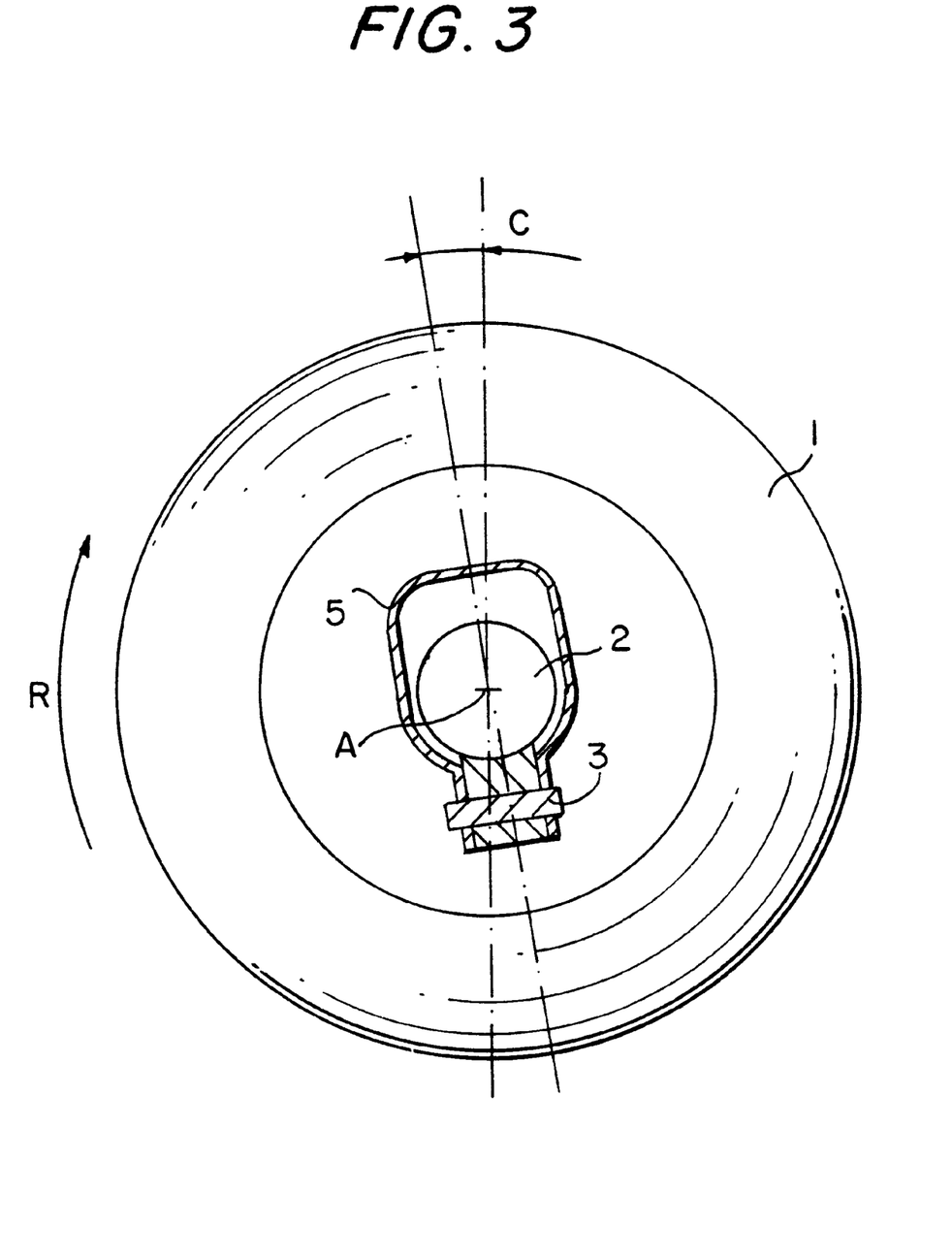
FIG. 3 demonstrates the wheel suspension system in lateral view.
Figure 4:
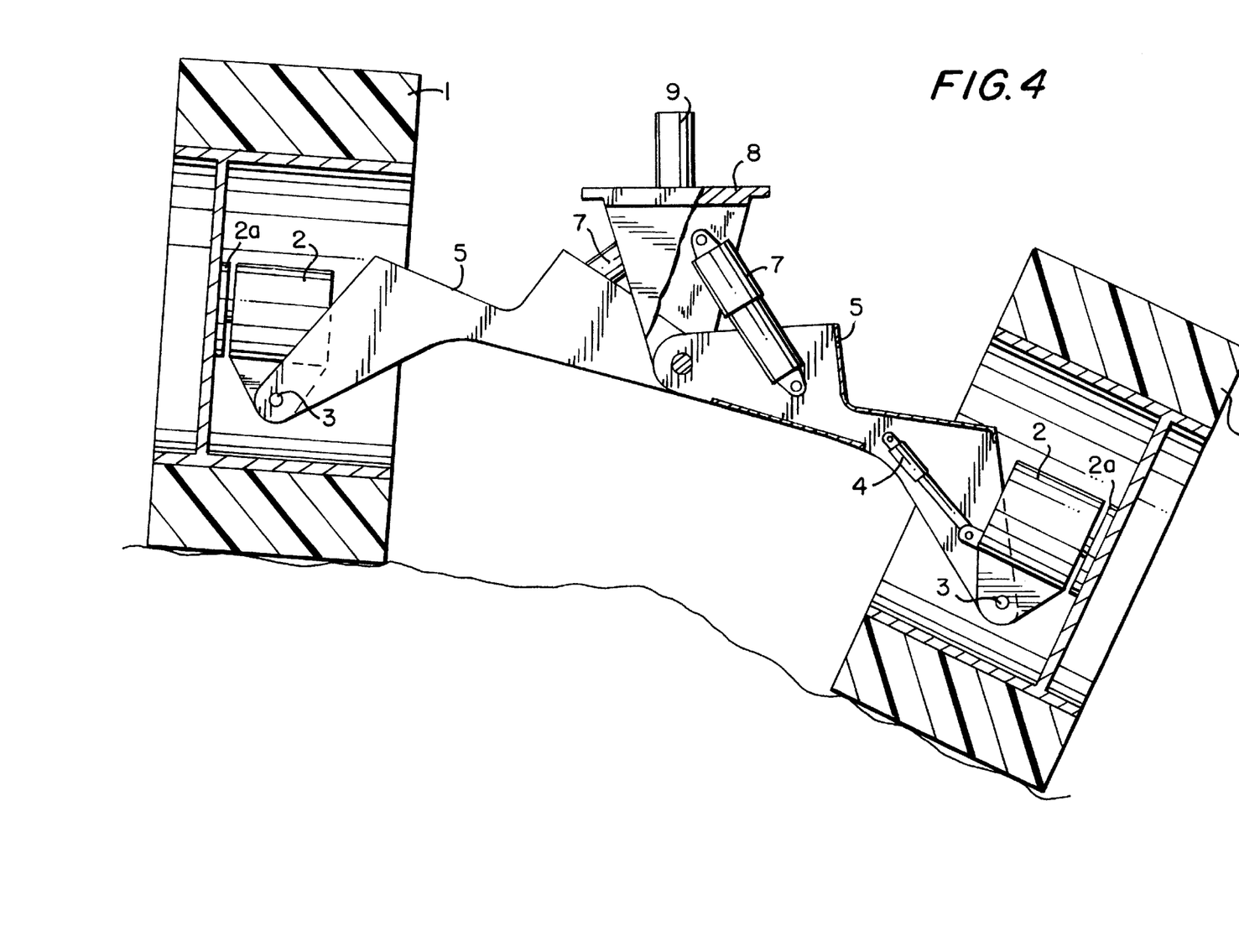
FIG. 4 presents, as an image shown in FIG. 1, a wheel suspension system in terrain.

FIG. 3 demonstrates the so-called caster angle concept with which the behavior of the wheel in the terrain can decisively be affected. In FIG. 3, the value of the caster angle C is positive, so that the axle beam 5 (supporting arm 5) has been rotated slightly around the horizontal central axis A of the wheel 1 against the direction of rotation R, whereby the suspension pin 3 has moved therewith. In fact, the entire axle beam 5 need not be rotated in the manner shown in FIG. 3; instead, the suspension pin 3 can be arranged at an angle correspondingly in the axle beam 5. The positive caster angle C will stabilize the vehicle at higher speeds. In addition, while tilting because of an obstruction, the wheel tries to mount on top of the obstruction, thus reducing the lateral forces directed at the body of the vehicle. On a soft running ground the wheel tends to mount on a more holding side as regards the point of contact of the tire. At a negative caster angle the effect is reverse.

In a multiaxial vehicle, different settings on different axles can be used to comply with load and behavioral requirements. By means of the magnitude of the caster angle the level of autocontrolling is affected.

As is disclosed above, the wheel suspension in the presentations of the figures has been provided with a tilt damping means, particularly with a damping cylinder 4. For the damping cylinder 4, single or double-acting hydraulic cylinder can be used as need be. Thereby, by preventing all fluid flows in the hydraulic cylinder 4 the wheel 1 is locked in desired position, and by restricting fluid flows, an appropriate damping is sought. When a double-acting cylinder 4 is used, the wheel 1 may also be force-straightened since with the structure shown in the figures the piston is furthermost within the cylinder 4 when the wheel 1 is in vertical position. Force-straightening can be needed e.g. on a highly soft driving ground or when driving on a slope. For the spring element 7, either single- or double-acting hydraulic cylinder can be used whenever needed. In addition to using a hydraulic cylinder, the invention can also utilize a hydro-pneumatic or pneumatic cylinder. The cylinder 7 is preferably connected with a hose or pipe either to a spring-action or gas-action pressure accumulator. In a system implemented with fluid-mediated action, the rigidity of the springs and the tilting differences of the terrain can be compensated steplessly by increasing or decreasing the fluid quantity in various spring elements. A vehicle, such as forest tractor, provided with the structure depicted in the figure and with motion angles there indicated, is enabled to drive at about 20° tilting on a base without any deviation of the body structure from the horizontal level in lateral direction. Efforts are made to demonstrate particularly this aspect in FIG. 4.

Figure 5:
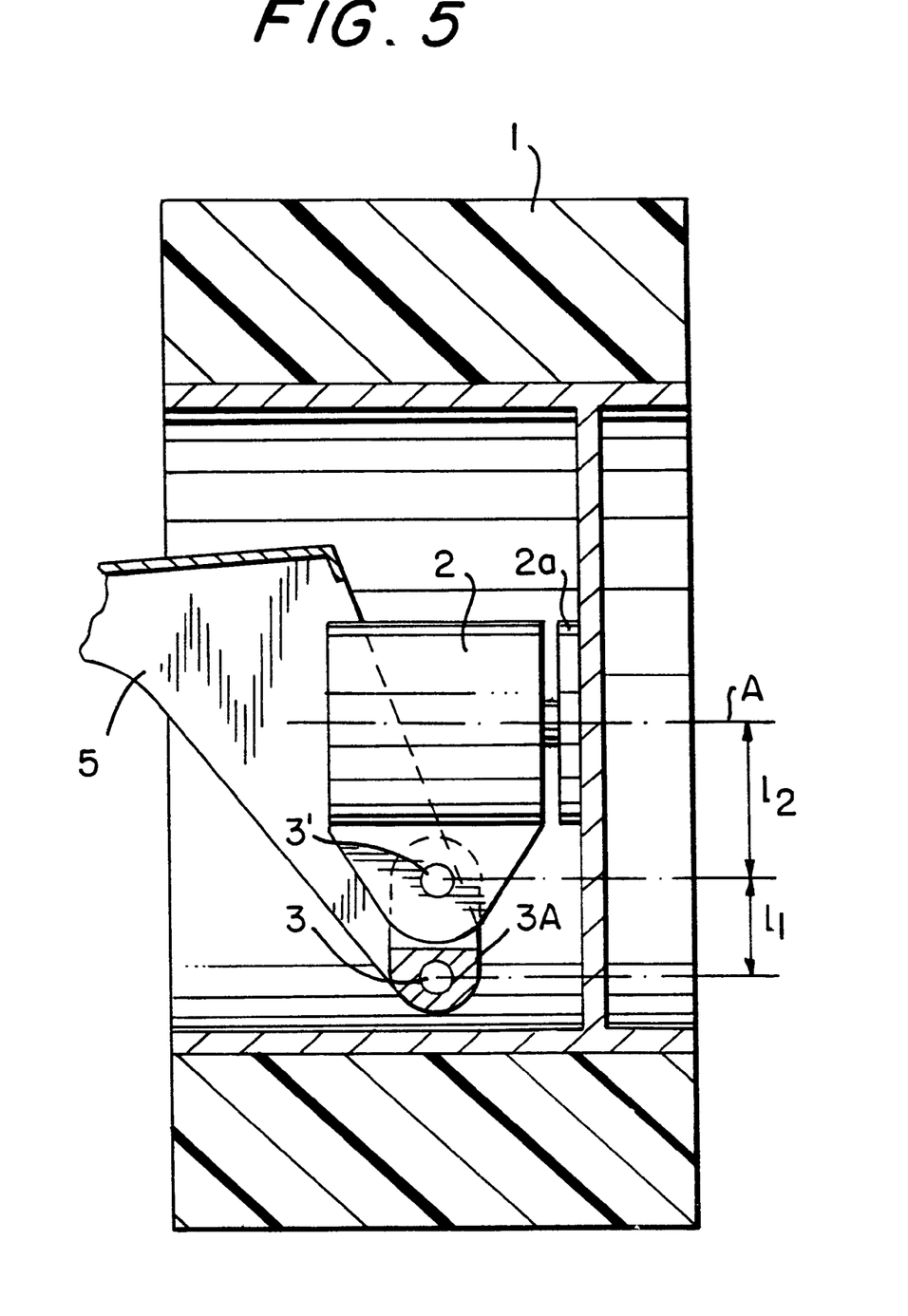
FIGS. 5 and 6 present a second embodiment of the wheel suspension system of the invention.
Figure 6:
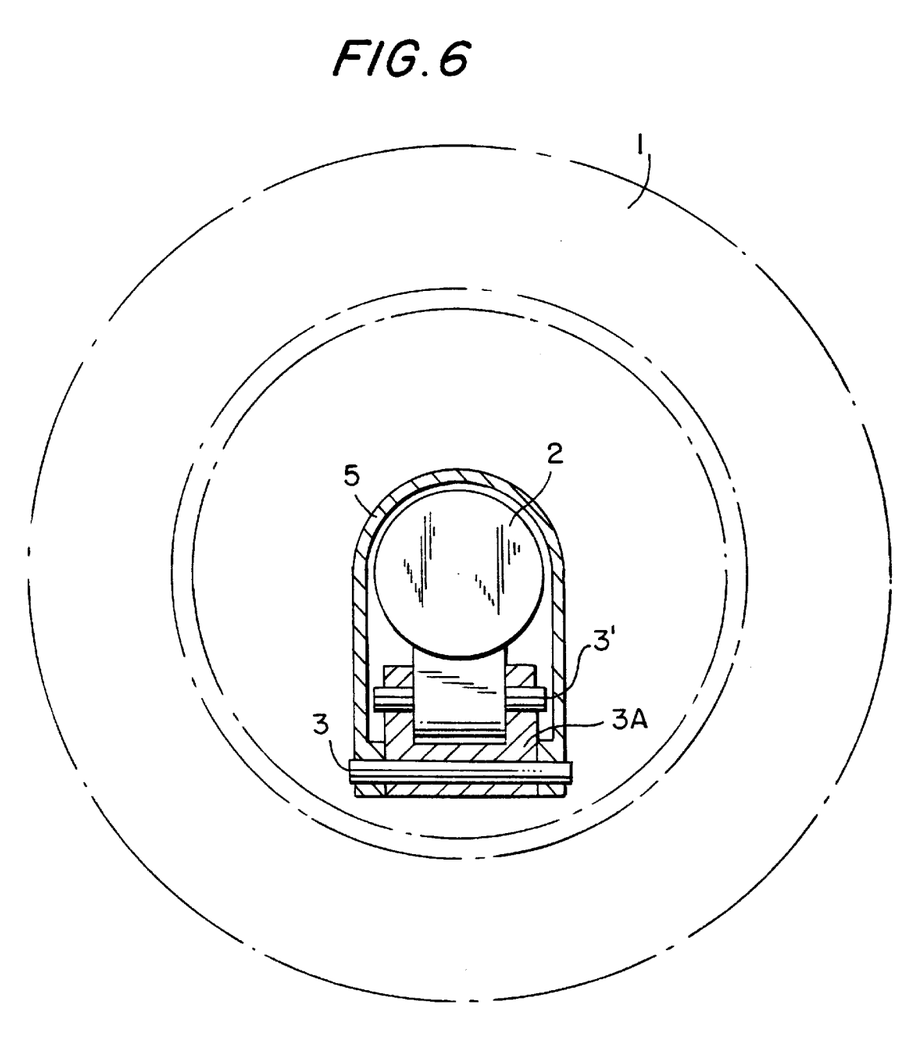
Figure 7:
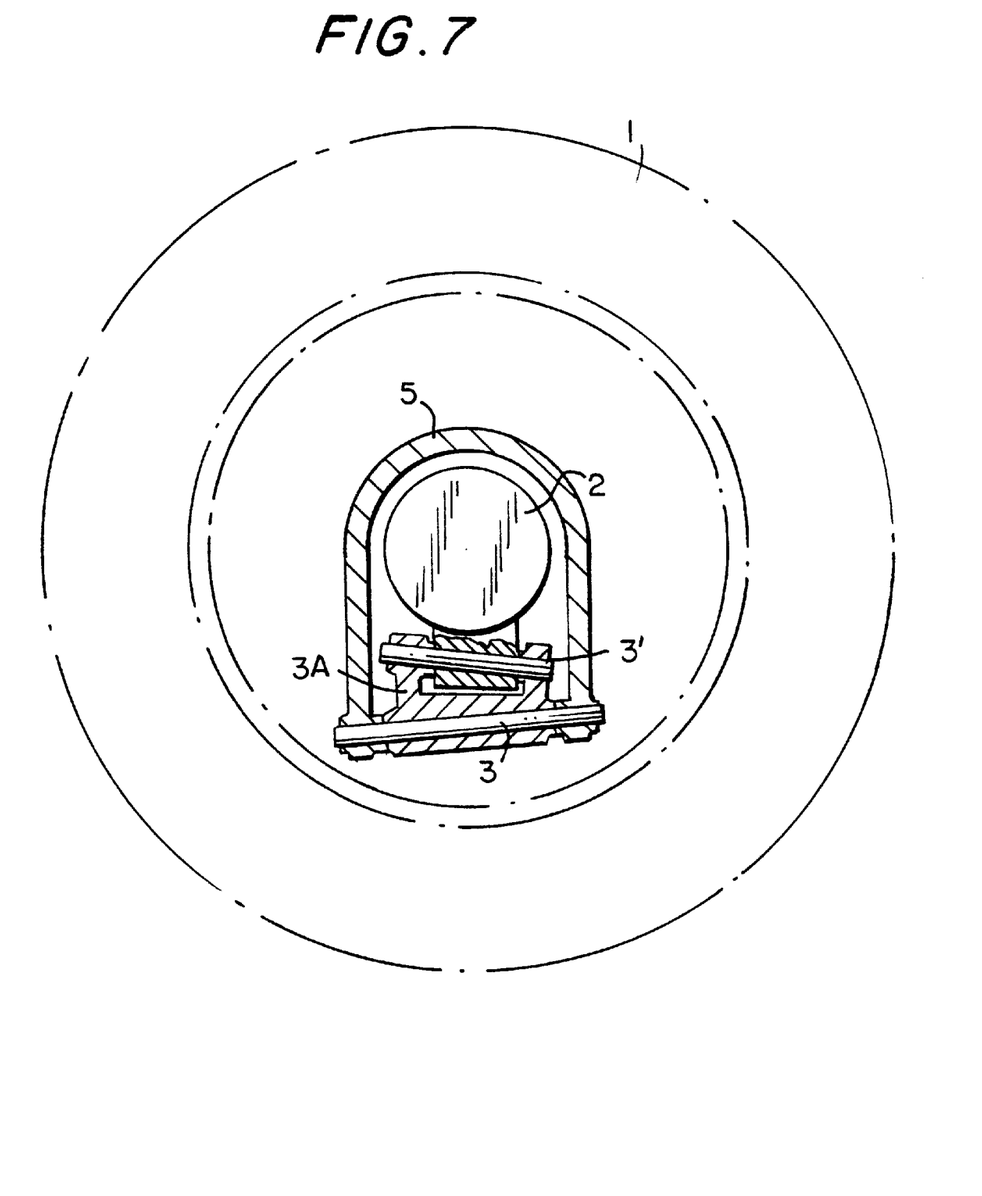
FIG. 7 represents yet another embodiment of the present invention.

In FIGS. 5 and 6, an alternative embodiment to the structure described above is presented. The wheel suspension system shown in said figures deviates from what is described in the foregoing in that the traction motor 2 has not been suspended directly on the axle beam 5; instead, in the present embodiment an intermediate support 3A has been articulately mounted on the axle beam 5 with the aid of a suspension pin 3, and on said intermediate support 3A, the traction motor 2 has been suspended by a second suspension pin 3'. In FIG. 5, the height-direction distance between the suspension pins 3 and 3' is indicated by reference $1_1$; respectively, the height-direction distance between the second suspension pin 3' and the centre axis A of wheel 1 is indicated by reference $1_2$, whereby the total distance in height direction from the horizontal central axis A of wheel 1 to the suspension point in the axle beam 5 (suspension pin 3) is $1_1+1_2$. In the presentation of FIG. 6, the suspension pins 3,3' are presented in parallel, but they may also be arranged at a small angle relative to one another, as in FIG. 7 whereby with said design a similar effect can be achieved as described in conjunction with FIG. 3 (caster angle). Using the design shown in FIGS. 5 and 6, the positioning of the wheel 1 to the terrain is even freer than with the design of FIGS. 1–4.

The principle of freely swinging wheel of the invention can be applied to nearly all springing and axle structures known in the art, also in steering, in a separately rotating wheel e.g. in so-called Mac Pherson structure. It is furthermore possible that in a vehicle provided with the wheel-suspension system of the invention, e.g. in a forest tractor, a crawler track is led around the wheels in succession in order to improve the terrain properties of the vehicle. In addition, the design may have been so implemented that the wheels in succession are tilted simultaneously and to an equal extent, whereby the crawler track inclines together with the wheels as one unit. On the other hand, the design may have been so implemented that the consecutive wheels are allowed to incline individually, whereby the crawler track is required to be such in structure that it is enabled to twist in order to accomodate to variations of inclinations in the driving base.

The wheel suspension system of the invention may also be applied, deviating from what is presented in the figures, in a vehicle provided with mechanical power transmission. The mechanical power transmission can thus be implemented by positioning a universal joint in the center point of the wheel (on the central axis of the wheel and in the vertical central level of the wheel) and by providing the drive shaft with a sensitively bearably carried telescopic structure, allowing changes in drive shaft length. Furthermore, the wheel suspension arrangement may also be applied in non-traction, that is, freely rotating wheels, whereby, applying for instance the design of FIG. 1, only the wheel hub is arranged in place of the traction motor 2 whereon the wheel 1 has been bearably carried. Various embodiments of the invention may be varied within the scope of the inventive idea defined in the accompanying claims below.

I claim:

1. A wheel suspension system for a vehicle having a frame and a first wheel oriented in a longitudinal direction of the vehicle, comprising:

a first axle beam coupled to the frame of the vehicle;

a first traction motor coupled to the first wheel for rotating the first wheel; and pivot means for pivotally coupling said first traction motor to said first axle beam such that the first wheel is tiltable in a direction transverse to the longitudinal direction of the vehicle, said pivot means comprising an intermediate support connected to said first axle beam by a first suspension pin and to said first traction motor by a second suspension pin.

2. A wheel suspension system according to claim 1, wherein the vehicle further comprises a second wheel oriented in a longitudinal direction of the vehicle and laterally spaced with respect to the first wheel, a second axle beam coupled to the frame of the vehicle; a second traction motor coupled to said second wheel for rotating said second wheel; and second pivot means for pivotally coupling said second traction motor to said second axle beam such that said second wheel is tiltable in the direction transverse to the longitudinal direction of the vehicle.

3. A wheel suspension system according to claim 1, wherein said pivot means are situated such that said first axle beam is oriented in a direction angularly offset from a line extending perpendicular from the ground at the point of tangency of the first wheel through the central axis of the first wheel thereby forming a caster angle.

4. A wheel suspension system according to claim 3, wherein said pivot means are displaced a distance below the central axis of the first wheel and said first axle beam is angularly offset in a direction opposite from the direction of rotation of the first wheel.

5. A wheel suspension system according to claim 1, wherein said first suspension pin is substantially parallel to said second suspension pin.

6. A wheel suspension system according to claim 5, wherein said first suspension pin and said second suspension pin are substantially cylindrical and have a central axis, said central axis of said first suspension pin being arranged at an angle with respect to said central axis of said second suspension pin thereby forming a caster angle.

7. A wheel suspension system according to claim 1, further comprising damping means for reducing the tilting of the first wheel, said damping means being coupled to said first axle beam and said first traction motor.

8. A wheel suspension system according to claim 7, wherein said damping means comprises a damping cylinder having a first mounting point on said first axle beam and a second mounting point on said first traction motor, said damping cylinder being selected from the group consisting of a hydraulic cylinder, a hydropneumatic cylinder and a pneumatic cylinder.

9. In a vehicle having a frame, a pair of laterally spaced wheels including first and second wheels oriented in a longitudinal direction of the vehicle, an axle assembly including first and second axle beams coupled to said frame, a first traction motor coupled to said first wheel for rotating said first wheel and a second traction motor coupled to said second wheel for rotating said second wheel, the improvement comprising:

first pivot means for pivotally coupling said first traction motor to said first axle beam such that said first wheel is tiltable in a direction transverse to the longitudinal direction of the vehicle, said first pivot means comprising an intermediate support connected to said first axle beam by a first suspension pin and to said first traction motor by a second suspension pin, and second pivot means for pivotally coupling said second traction motor to said second axle beam such that said second wheel is tiltable in the direction transverse to the longitudinal direction of the vehicle, said second pivot means comprising an intermediate support connected to said second axle beam by a third suspension pin and to said second traction motor by a fourth suspension pin.

10. A wheel suspension system for a vehicle, comprising a wheel hub for receiving a tire, a traction motor rotatably connected to said wheel hub, an intermediate support member, and an axle beam having a first longitudinal suspension pin articulatedly connecting said intermediate support member to said axle beam and a second suspension pin articulatedly connecting said traction motor to said intermediate support member, whereby said wheel suspension system is adapted to allow said wheel hub to tilt freely around said first suspension pin irrespective of the tilting of the vehicle or said axle beam for improved stability on sloped terrain.

11. The wheel suspension system according to claim 10, wherein said first suspension pin is arranged in a substantially horizontal position.

12. The wheel suspension system according to claim 10, wherein said first suspension pin is pivoted in a propagation direction of the vehicle from a horizontal direction against a direction of rotation of said wheel hub creating a positive caster angle.

13. The wheel suspension system according to claim 10, wherein said second pin is arranged to be substantially parallel in direction relative to said first pin.

14. The wheel suspension system according to claim 10, wherein said first and second suspension pins are arranged to be at a slight angle relative to each other.

15. The wheel suspension system according to claim 10, further comprising damping means rotatably connected between said axle beam and said traction motor to provide a reduction in tiling of said wheel hub.

16. The wheel suspension system according to claim 15, wherein said damping means are hydraulic, hydropneumatic or pneumatic.

17. The wheel suspension system according to claim 10, wherein said traction motor is a hydraulic motor.

* * * * *